United States Patent [19]

Hatfield et al.

[11] Patent Number: 4,538,487

[45] Date of Patent: Sep. 3, 1985

[54] METHOD AND APPARATUS FOR STRIPPING SHIELDED FLAT CABLE

[75] Inventors: John G. Hatfield, Camp Hill; Robert Volinskie, Hershey, both of Pa.

[73] Assignee: AMP Incorporated, Harrisburg, Pa.

[21] Appl. No.: 600,617

[22] Filed: Apr. 16, 1984

[51] Int. Cl.³ .............................................. H02G 1/12
[52] U.S. Cl. .................................................... 81/9.51
[58] Field of Search ................. 81/9.51, 9.5 R, 9.5 C; 83/924, 925; 29/828, 426.1, 426.2

[56] References Cited

U.S. PATENT DOCUMENTS

| 3,316,781 | 5/1967 | Bignell et al. | 81/9.51 |
| 3,621,560 | 11/1971 | Bright | 29/828 |
| 3,774,478 | 11/1973 | Carpenter et al. | 81/9.51 |
| 4,120,217 | 10/1978 | Rodd et al. | 81/9.51 |
| 4,394,828 | 7/1983 | Garbis et al. | 81/9.51 |

OTHER PUBLICATIONS

Research Disclosure, No. 111, Jul. 1973, Portable Tool for Removing the Covering and Protective Layer of a Heavy Electric Cable, 11145.

Primary Examiner—Roscoe V. Parker
Attorney, Agent, or Firm—F. Brice Faller

[57] ABSTRACT

Method and apparatus for preparing shielded flat cable for termination employs blades which penetrate cable jacket and shield on opposed edges.

7 Claims, 10 Drawing Figures

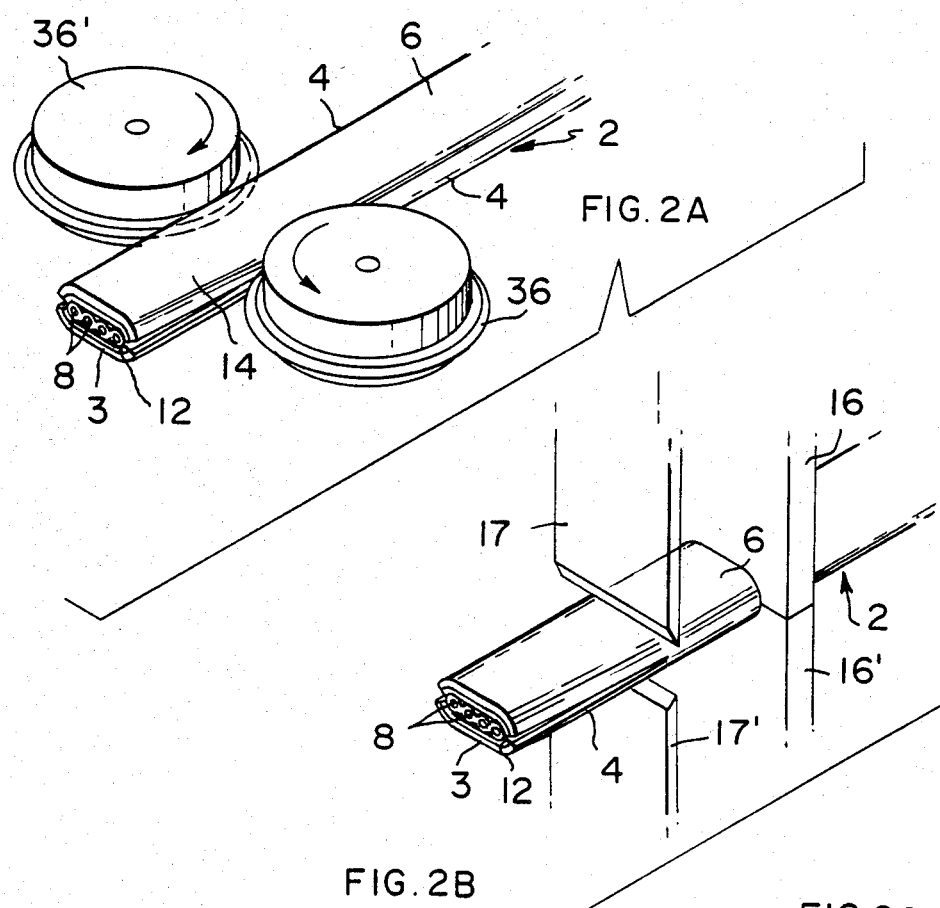
FIG. 2A
FIG. 2B
FIG. 2C
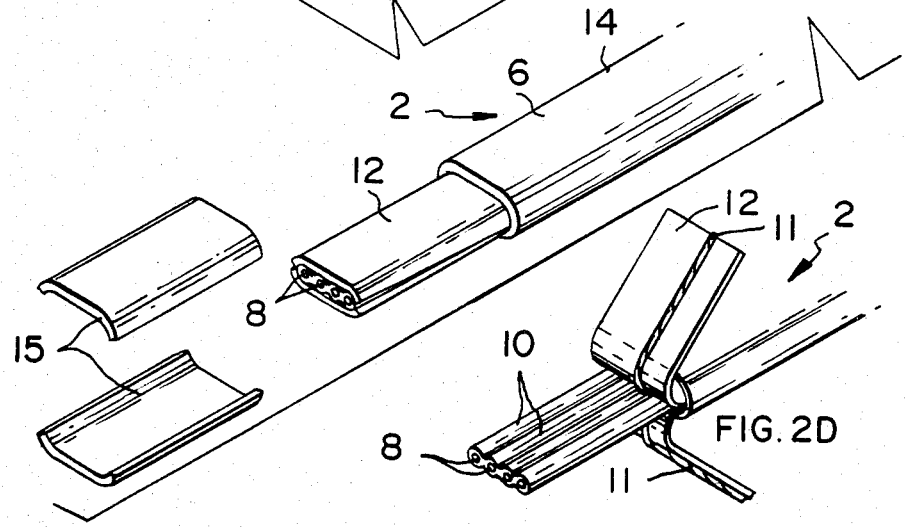
FIG. 2D

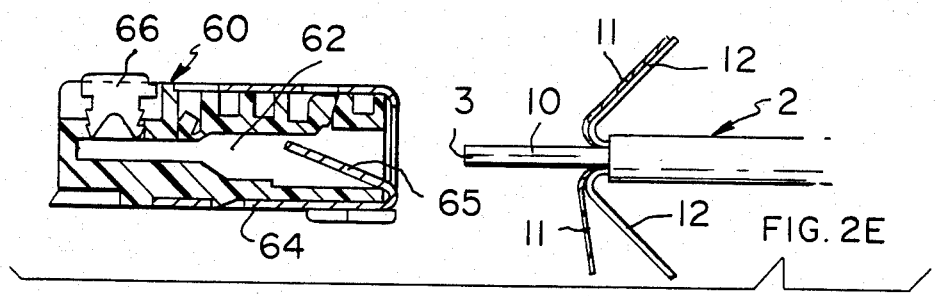
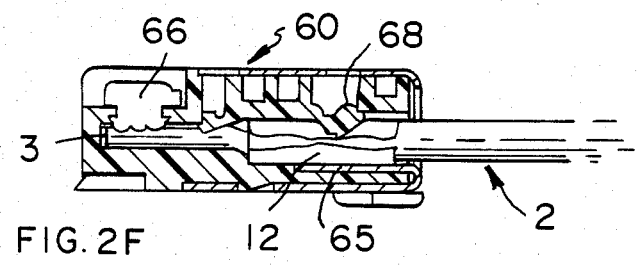
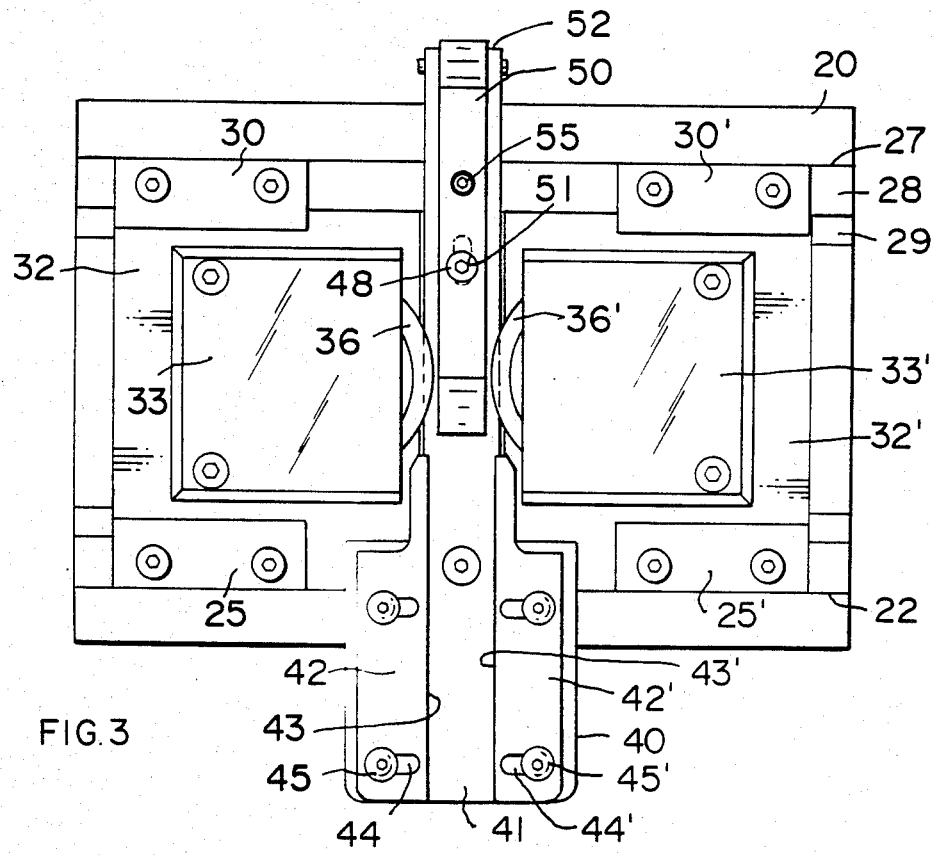

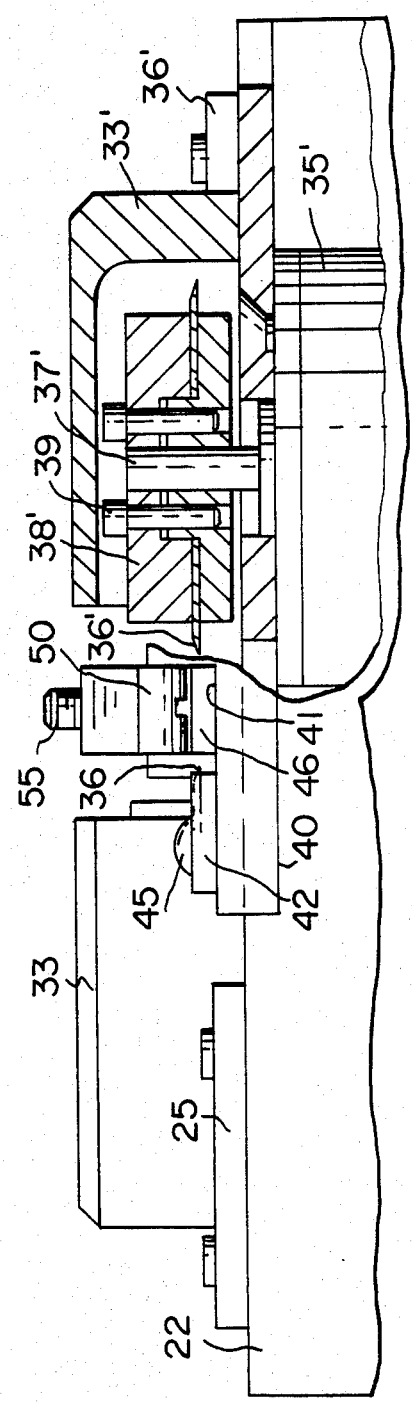
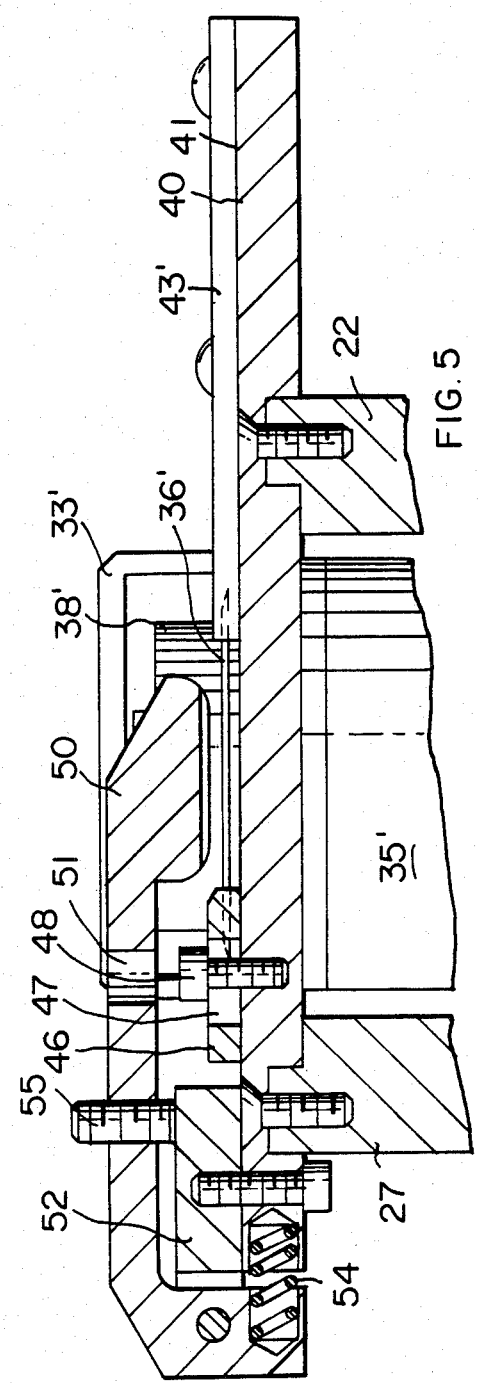
FIG. 4
FIG. 5

METHOD AND APPARATUS FOR STRIPPING SHIELDED FLAT CABLE

BACKGROUND OF THE INVENTION

The present invention relates to method and apparatus for preparing shielded cable for termination to a shielded plug.

U.S. Pat. No. 4,457,575, describes a modular plug having a shield to protect against EMI/RFI and ESD at the interface with a shielded flat cable. Such a plug is sold by AMP Incorporated as its SDL or Shielded Data Link Connector. Its primary usage is in computers, computer peripherals, video games, point of sale equipment, and process control equipment. To prepare the cable for mass termination, the outside insulative jacket at the end of the cable in stripped away and the underlying shield is rolled or folded back against the outside jacket where it contacts an extension of the connector shield in the cable receiving opening of the plug.

A known method of preparing a shielded flat cable for termination entails first removing the outside jacket proximate the end of the cable using a stripping tool such as that described in U.S. Pat. No. 3,774,478. The exposed conductive shield is then cut on opposite edges of the cable and folded back against opposed flat surfaces of the cable. This method, while effective, is quite time consuming.

SUMMARY

The present invention provides for preparing the cable by first simultaneously cutting both the jacket and the shield on the opposed edges of the cable. The jacket is then cut transversely of the cable as in the known method and removed, and the exposed shield is folded back against the jacket.

The invention further resides in apparatus for accomplishing the above procedure. Rotary cutting blades impinge on a path defined by a cable guide just sufficiently to cut the shield on the opposed edges of the cable, while a resilient clamp confines the cable to the plane of the cutting blades without preventing axial movement. In the bench version of the apparatus a stop provided on the path limits the travel of a cable fed between the blades. The apparatus and method thus shorten preparation time and further facilitate removal of the outer jacket at the end of the cable.

BRIEF DESCRIPTION OF THE DRAWINGS

FIGS. 2A-2F are schematic perspectives of the cable preparation and termination steps.

FIG. 3 is a plan view of the apparatus.

FIG. 4 is a partially cut away end view.

FIG. 5 is a side section taken along the cable feed path.

DETAILED DESCRIPTION OF THE PREFERRED EMBODIMENT

Figure 1:
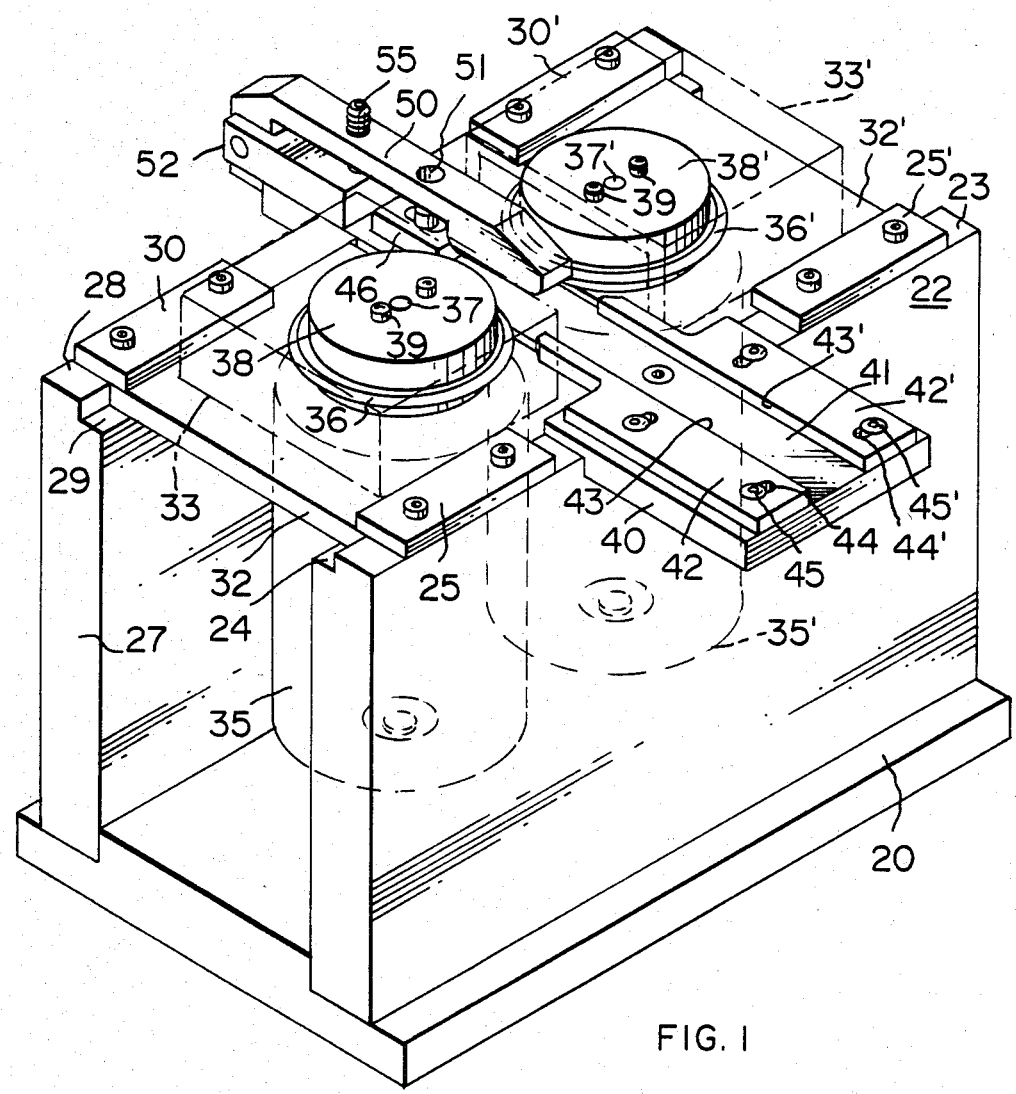
FIG. 1 is a perspective of the apparatus of the present invention.

Referring to FIG. 1, the apparatus includes a base 20 having a front wall 22 and a rear wall 27 fixed thereto. The walls 22, 27 have respective top surfaces 23, 28 and respective support ledges 24, 29 which support the mounting plates 32, 32'. Twin electric motors 35, 35' are carried under plates 32, 32' and provide the drive means for respective rotary cutting blades 36, 36' in housings 33, 33'. A deck 40 mounted across surfaces 23, 28 provides a guide surface 41 thereon having plates 42, 42' fixed thereto. The plates 42, 42 have inward facing parallel walls 43, 43' which define a feed path for the cable to be prepared. A clamp 50 is pivotally mounted to a pivot block 52 fixed on the rear of deck 40 and is resiliently biased toward surface 41.

FIG. 2A is a schematic perspective showing the cable 2 as the end 3 to be stripped passes between the rotary blades 36, 36'. The cable contains a side-by-side coplanar array of insulated conductors 8 immediately surrounded by a foil shield 12 and an outside insulative jacket 14. The cable is defined by opposed parallel outside edges 4 and opposed flat surfaces 6 extending therebetween; the walls 43, 43' (FIGS.1 and 3) and blades 36, 36' are spaced to assure that the cable 2 passes directly between the blades 36, 36' which cut completely through the outside jacket 14 and foil 12 in the plane of conductors 8. Note that while this cable has a foil shield, the cutting of a braided shield by high speed rotary saw blades is also contemplated FIG. 2B shows the cable 3 held by clamping members 16,16' with shearing blades 17, 17' poised to cut the jacket 12 through opposed surfaces 6 transversely of the axis of the cable. These cuts are made the same distance from the end 3 as the cuts in side edges 4, and must be performed without cutting the shield 12. This operation may be suitably performed by apparatus of the type disclosed in U.S. Pat. No. 3,774,478.

FIG. 2C schematically depicts the jacket fragments 15 renmoved to expose the shield 12. The cuts in the side edges 4 facilitate this removal insofar as two pieces rather than a single tubular slug of jacket 14 are pulled from the end 3. This offers considerable advantage over the known method insofar as shield 12 can tear when a single tubular slug of cable jacket is drawn from the end 3, due to adhesion between the outer jacket and the sheild. This is a problem where the shield 12 is a polyester/foil laminate and a PVC jacket is extruded directly against the polyester.

FIG. 2D shows the jacket 12 being folded back against opposed flat surfaces 6 of the cable 2, exposing the drain wire 11. This step may be readily performed by directing an air current toward the end 3, or by brushes. The conductors 8 with insulation 10 are now exposed.

FIG. 2E is a side section of a shielded connector 60 of the type described in U.S. patent application Ser. No. 420,762, with the prepared cable 2 poised for entry in cable receiving opening 62. The connector shield 64 has an extension 65 extending into opening 62 positioned to bear against the foil 12 and drain wire 11.

FIG. 2F shows the cable 2 terminated to connector 60. The terminals 66 have been driven through the insulation 10 to contact the conductors therein and the strain relief member 68 has been latched in place as taught in U.S. Pat. No. 3,860,316.

FIG. 3 is a plan view of the apparatus showing the clamps 25, 25' on front wall 22 and clamps 30, 30' on the rear wall. These clamps permit adjusting the position of mounting plates 32, 32' which determine the position of rotary blades 36, 36' in housings 33, 33' respectively. The plates 42, 42' have slots 44, 4' receiving screws 45, 45' therethrough for adjusting their position on deck 40 so that varying widths of cable may be accommodated. The clamp 50 cooperates with guide surface 41 to prevent vertical movement of a flat cable passing therebetween as its edges are slit.

FIG. 4 is an end view of the apparatus partially cut away to show blade 36' fixed in clamp 38', which is fixed on shaft 37' driven by motor 35' therebelow. The clamp 38' is fixed against blade 36' by screws 39', which may be removed for replacing or sharpening the blade 36'. The clamp 50 is disposed to constrain the cable against surface 41 so that the blades 36, 36', situated half a cable thickness above surface 41, will slit the cable edges approximately midway between the opposed flat surfaces of the cable. Note that blade 36 protrudes just beyond plate 42, perferably by a distance just sufficient to penetrate the cable jacket and the foil.

FIG. 5 is a cross section through the center of the apparatus and shows the orientation of the blade 36' between the clamp 50 and surface 41. The clamp 50 is pivotally mounted to pivot block 52 and resiliently disposed downward by a spring 54 as shown. A stop screw 55 bears against block 52 and determines the clearance between clamp 50 and surface 41 in the vicinity of blades 36,36' and thus determines the force which clamp 50 extents on the cable. This should be carefully adjusted to constrain the cable against reticle movement without impeding axial feed. A cable stop 46 is fixed to surface 41 by a bolt 48 through slot 47. The stop 46 may thus be positioned to predetermine the length of slits in the edges of the cable.

Note that while the position of the axes of the rotating blades are adjustable, they remain fixed during a given cable slitting operation. The invention also envisions rotary blades having non-fixed axes, as well as other blade means. For example, the cable could be fixed while blades move inward to penetrate the edges, and then move longitudinally of the cable toward its end. Likewise the blades could be driven by belts or gears rather than being axially mounted on the motor shafts.

The foregoing is exemplary and not intended to limit the scope of the claims which follow.

We claim:

1. A method of preparing the end of shielded flat multiconductor cable for termination, the cable comprising a plurality of side by side insulated conductors in a coplanar array surrounded by a conductive shield which is surrounded by a continuous insulative outside jacket, the cable having opposed side edges and opposed flat external surfaces extending therebetween, the method comprising the steps of, simultaneously cutting the opposed edges of said cable in the plane of the conductors between said end and a predetermined distance therefrom, said cutting being accomplished by a pair of cutting blades which penetrate the outside jacket and said shield, cutting into the opposed flat external surfaces transversely of the cable at substantially the predetermined distance from said end, said cutting substantially penetrating said outside jacket without cutting said shield, removing the outside jacket for said predetermined distance from said end, folding the shield so exposed back against the outside jacket of said cable.

2. The method of claim 1 wherein the cutting of said opposed edges is accomplished by feeding the end of said cable between a pair of rotary cutting blades having stationary axes.

3. An apparatus for preparing the end of a shielded flat multiconductor cable for termination, the cable comprising a plurality of side by side insulated conductors in a coplanar array surrounded by a conductive shield which is surrounded by a continuous insulative outside jacket, the cable having opposed side edges and opposed flat external surfaces extending therebetween, the apparatus comprising, guide means defining an axial feed path for said cable, said guide means confining said cable against movement transversely of its axis in the plane of the cable, a pair of cutting blades flanking said feed path on opposite sides thereof, said blades being arranged to cut the opposed edges of said cable in the plane of the conductors, said blades being arranged to penetrate said outside jacket and said shield, confining means for restricting said cable against movement transverse to the plane thereof in the vicinity of the cutting blades.

4. The apparatus of claim 3 which further comprises stop means on said feed path a predetermined distance beyond said cutting blades.

5. The apparatus of claim 3 wherein said cutting blades are rotary cutting blades.

6. The apparatus of claim 5 wherein said rotary cutting blades have stationary axes, the blades being spaced to impinge the opposed edges of said cable moved therebetween on said feed path.

7. The apparatus of claim 3 wherein said confining means comprises resilient clamping means which bears against opposed flat surfaces of said cable without preventing axial movement thereof.

* * * * *